United States Patent
Auh et al.

(10) Patent No.: US 8,067,916 B2
(45) Date of Patent: Nov. 29, 2011

(54) POWER CUTTING TOOL WITH SYNCHRONIZED DUST CONTROL DEVICE

(76) Inventors: Su Hak Auh, Annandale, VA (US);
Charles J. Kim, Annandale, VA (US)

(*) Notice: Subject to any disclaimer, the term of this patent is extended or adjusted under 35 U.S.C. 154(b) by 484 days.

(21) Appl. No.: 12/318,221

(22) Filed: Dec. 23, 2008

(65) Prior Publication Data

US 2009/0183614 A1    Jul. 23, 2009

Related U.S. Application Data

(60) Provisional application No. 61/011,956, filed on Jan. 23, 2008.

(51) Int. Cl.
*G05B 11/01* (2006.01)
(52) U.S. Cl. ............................ 318/560; 388/937; 83/471
(58) Field of Classification Search .................... 83/471, 83/471.2, 471.3, 491; 388/937; 318/560, 318/445, 452
See application file for complete search history.

(56) References Cited

U.S. PATENT DOCUMENTS

| | | | |
|---|---|---|---|
| 3,022,806 A | 2/1962 | Johnston | |
| 4,257,297 A | 3/1981 | Nidbella | |
| 4,300,426 A * | 11/1981 | Weaver | 83/471.3 |
| 4,875,398 A | 10/1989 | Taylor et al. | |
| 5,375,495 A * | 12/1994 | Bosten et al. | 83/520 |
| 5,699,705 A * | 12/1997 | Sibbet | 83/13 |
| 6,055,734 A * | 5/2000 | McCurry et al. | 30/391 |
| 6,154,919 A * | 12/2000 | Hetko | 15/339 |
| 6,941,660 B1 * | 9/2005 | Varos | 30/93 |
| 7,398,719 B2 | 7/2008 | Peot et al. | |
| 2004/0112191 A1 | 6/2004 | Whiffen | |
| 2006/0266184 A1 | 11/2006 | Hetcher et al. | |

\* cited by examiner

*Primary Examiner* — Rina Duda
(74) *Attorney, Agent, or Firm* — J. Reed Batten, Jr.

(57) ABSTRACT

A cutting tool such as a miter saw, arranged to have an arrangement for selectively making and breaking power of a first circuit and an independent second second circuit each connected respectively to a first motor operating the cutting tool and to a second motor operating a dust suppressor such as a vacuum device. The arrangement enables the two circuits to serve the first and second motors in synchrony and to be operated by the switch of the cutting tool. The arrangement may comprise a relay adapted to energize and de-energize the second circuit. The second circuit may comprise one or more electrical receptacles enabling the second motor to operate under control of the switch after being plugged in to one of the receptacles. The cutting tool may comprise a receptacle which is hard wired to the first circuit. The cutting tool may incorporate a dynamic brake.

11 Claims, 3 Drawing Sheets

POWER CUTTING TOOL WITH SYNCHRONIZED DUST CONTROL DEVICE

This application claims the benefit of U.S. provisional application No. 61/011,956, filed Jan. 23, 2008.

BACKGROUND OF THE INVENTION

1. Field of the Invention

The present invention relates to power tools, and more particularly to electrically powered cutting tools having independently powered dust control.

2. Description of the Prior Art

Table saws, miter saws, bandsaws, circular saws, drills, sanders, and like tools are used to cut materials such as virgin lumber, composite lumber, plasterboard, and the like. Cutting such materials immediately generates large quantities of dust. This dust may present health hazards to people, may obscure the work, and in some instances may present hazards such as fire or explosion hazards.

Obscuring of the work aggravates a condition which plagues cutting tools, namely, that the actual point of contact of the cutting tool with a workpiece is obscured by the conditions of work under the best of circumstances. This situation has been addressed by provision of a light for illuminating the workpiece at the point of contact with the cutting tool. However, effective lighting of this aspect of cutting work remains delicate. The lamp must bear advantageously on the apparatus, not being shielded or obstructed by a blade or the like for example. Also, the light must be sufficiently robust to withstand the conditions of work.

One condition of work is that of temperature. While light sources such as light emitting diodes and compact fluorescent lamps are desirable in that they are highly efficient, they are also subject to the problem of dissipation of heat. These types of light sources must be well ventilated in order to avoid damage by heat. The dusty environment of cutting work further aggravates this problem as dust tends to permeate everywhere and to interfere with effective ventilation.

Dust collection and suppression apparatuses have been proposed. A vacuum source or pressure source may be introduced to work in cooperation with a powered cutting tool to collect, dispose, or suppress dust.

However, many powered cutting tools are provided that do not incorporate or cooperate with dust collectors or suppressors. Vacuum and other pressure based devices may be obtained and operated in tandem with electrical cutting tools. However, if an independent electrically operated vacuum or blowing device is utilized in tandem with an electrically powered cutting tool, there can arise problems in managing electrical supply and control functions.

This is particularly true where the cutting tool is to be utilized in residential settings. Modern residences are typically provided with general purpose electrical circuits to support transient loads such as power tools. However, some power tools operate at power levels approaching the limits of the ampacity which can be sustainably supplied by general purpose electrical circuits. It may be necessary therefore to provide power to a cutting tool from one circuit, and to provide power to an auxiliary load, such as a vacuum or blowing device in order to collect, control, or suppress dust generated by the cutting tool.

Connecting two independent motors to power sources based on two circuits further presents an inconvenience, namely, redundant switching and controlling of the two motors. It becomes necessary to operate two switches each time the two motors are to be switched on or off. This can become quite annoying if the vacuum or pressure device has a switch which is located away from that of the cutting tool. Therefore, there exists a need to provide for convenient switching of separate motors supplied from different electrical circuits. More particularly, it would be desirable to effect simultaneous switching of two motors from the switch of the cutting tool.

SUMMARY OF THE INVENTION

The present invention addresses the above stated need by providing convenient common control of separate circuits for powering two separate motors. Not only is switching addressed by the invention, but practical connection to two circuits is also facilitated.

To these ends, the invention provides two power circuits switched in tandem. One circuit feeds the motor and auxiliary loads associated with the cutting tool, an illumination lamp for example, and the other feeds a standard electrical receptacle which may be utilized to connect to electrical power a vacuum or blowing appliance to suppress dust. Provision of a switched receptacle enables use with the cutting tool of a vacuum or blowing appliance which is independent of the cutting tool, for example by having a conventional plug and cord for connection to a standard electrical receptacle.

The novel tandem dual circuit arrangement is particularly suited to accommodating cutting operations in residential and similar settings. In residential settings, electrical general purpose receptacles are typically provided throughout the residence. The circuits, because they are for general purposes rather than for dedicated or known loads, are typically limited to fifteen or twenty amperes. It therefore frequently becomes necessary to utilize two different circuits when operating a cutting tool which by itself may require close to the ampacity of one general purpose power circuit, and when also requiring a separately powered vacuum or blowing device to suppress dust.

The cutting tool, which may be for example a miter saw, may have an incandescent lamp arranged to project light along the cutting blade to illuminate the point of cutting contact.

It is an object of the invention to provide simultaneous switching of two separate, distinct circuits for powering two motorized appliances from a single switch operator.

It is another object of the invention to enable a secondary switched load to be connected by conventional plug and cord to a simultaneously switched circuit.

It is a further object of the invention to provide illumination of the point of contact of a cutting tool with a workpiece.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
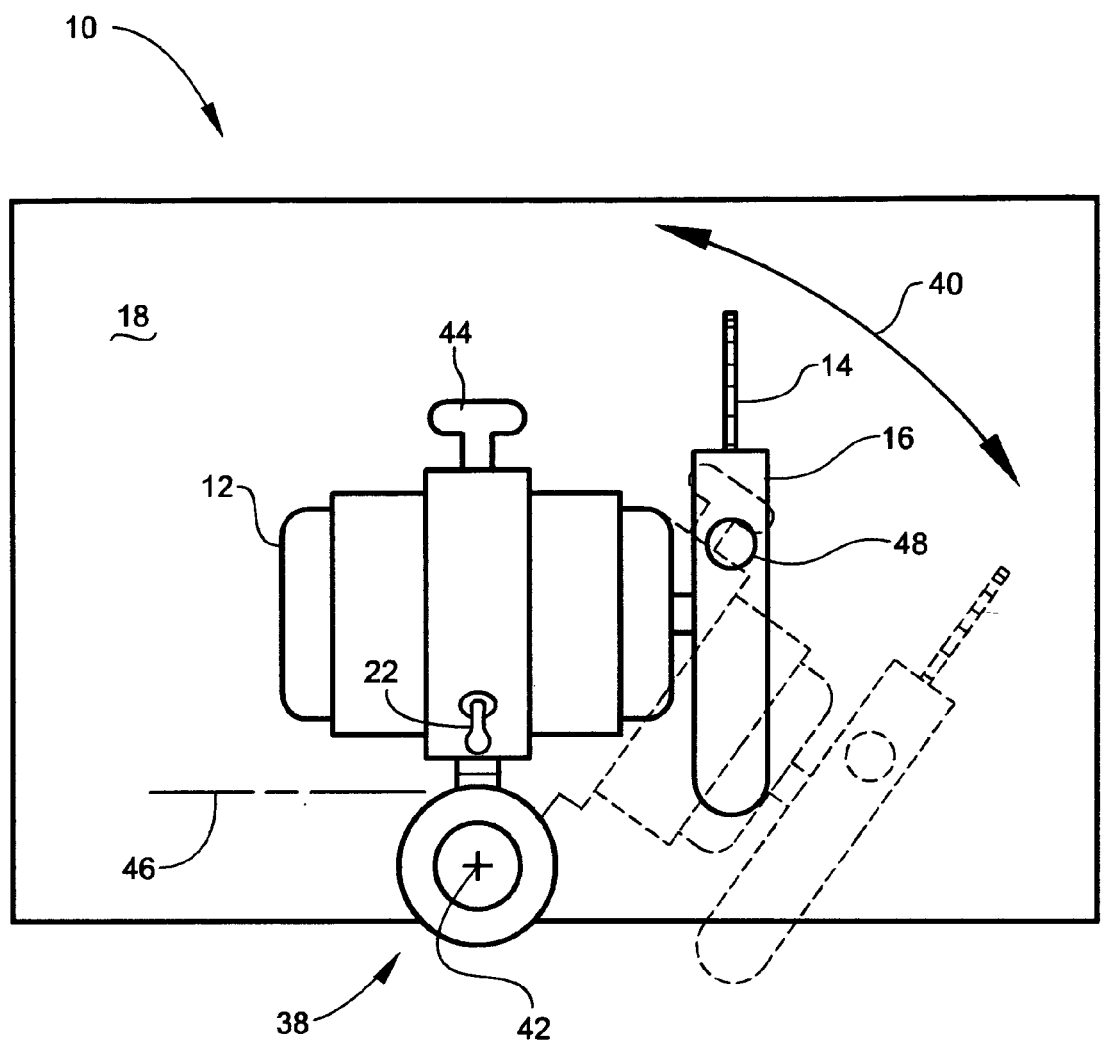
FIG. 1 is a diagrammatic top plan view of an exemplary cutting tool according to at least one aspect of the invention.

The present invention will be explained using the example of a miter saw 10, shown in in plan in FIG. 1. The miter saw 10 exemplifies a cutting tool for cutting a workpiece such as the workpiece 2, seen in FIG. 2. It should be understood at the outset that the invention is not limited in its application to miter saws, but rather applies to diverse types of tools having dynamic or moving cutting or abrading elements or both. Illustratively, tools such as circular saws, table saws, reciprocating saws, band saws, chain saws, drills, milling and machine tools, grinders, sanders, and other tools having cutting or abrading elements or both are encompassed by the invention.

The miter saw 10, and all other tools represented thereby comprise a frame on which are attached and supported a cutting tool electric motor 12, a dynamic cutting blade 14 which is operably drivable by the cutting tool electric motor 12 and which is movably supported on the frame, and a principal electrical circuit 24 attached to or supported on the frame. The dynamic cutting blade 14 may comprise a circular blade bearing teeth (not separately shown) which project radially outwardly from the circumference of the dynamic cutting blade 14. This is a conventional configuration for blades of circular saws and many miter saws, and need not be further described.

As employed herein, the term frame need not imply a discrete element unto itself, but rather signifies a structural platform to which the cutting tool electric motor 12, the dynamic cutting blade 14, the principal circuit, and ancillary apparatus may be fixed. The frame may comprise the housing of the cutting tool electric motor 12, a guard 16 for covering or partially covering the dynamic cutting blade 14, a work support table 18 on which may be placed a workpiece such as the workpiece 2, a separate and discrete frame (not shown) if desired, and other elements, taken individually or in any combination.

The miter saw 10 has a principal switch 20 (shown diagrammatically in FIG. 3) including a switch operator such as a switch lever 22 for enabling a human user to operate the principal switch 20. The principal electrical circuit 24, shown in FIG. 3 and further detailed hereinafter, supplies electrical power to the cutting tool electric motor 12 under on-off control of the principal switch 20.

The miter saw 10 has an auxiliary electrical circuit 26 (shown in FIG. 3) attached to the frame. The auxiliary circuit 26 is intended to supply electrical power to a dust suppressing appliance (not shown in its entirety) which is intended to be operated in conjunction with the miter saw 10, and to energize and de-energize an appliance electric motor 28 (see FIG. 3) which powers and operates the dust suppressing appliance.

It will be appreciated that the principal electrical circuit 24 is not necessarily a complete circuit unto itself. Rather, it may comprise a partial circuit intended to be connected to preexisting supply circuitry, such as residential electrical circuits (not shown) provided with general purposes electrical receptacles into which a plug and cord assembly 32 (see FIG. 3) may be inserted. Also, circuitry will be understood to comprise the number of conductors and specific connection schemes necessary to carry out the described functions, as well as supporting apparatus such as switches, relays, transducers, circuit breakers, transformers, and voltage dividers, among others. Circuitry and any of its individual components may vary in size, number, location, and logic from that specifically shown or described herein. The same holds true for the auxiliary electrical circuit 26.

The present invention links operation of the principal electrical circuit 24 to the auxiliary electrical circuit 26 so that plural loads, such as the cutting tool electric motor 12 and the appliance electric motor 28 may both be started and stopped in synchrony or simultaneously even though both may be supplied with electrical power from two separate or independent sources. To accomplish this, the miter saw 10 is provided with circuitry which inserts serially into the total circuitry of the dust suppressing appliance partial circuitry and electrical control elements which link or synchronize the two otherwise unrelated and independent power circuits.

It should be mentioned here that it is contemplated that the dust suppressing appliance may be an apparatus that is separate from and may be spaced apart from the miter saw 10, as well as being separate from and located in close proximity to the miter saw 10. The dust suppressing appliance may operate in any desired fashion to remove dust and similar particulate debris generated by cutting action of the dynamic cutting blade 14 from the vicinity of the workpiece 2 and the dynamic cutting blade 14. An exemplary dust suppressing appliance is a vacuum cleaner or other vacuum developing device. A vacuum developing device is an apparatus which has capability of reducing air pressure below that of the ambient environment of the miter saw 10. For example, a vacuum developing device (not shown) may include an air propulsion device (not shown), such as a fan or blower which is dynamically drivable by the appliance electric motor 28 located in communication with a generally enclosed chamber from which air is evacuated faster than air can replace ejected air.

A hose or other conduit may extend from the generally enclosed chamber to the vicinity of the dynamic cutting blade 14 such that dust generated by cutting operations is drawn away from the miter saw 10 and is conducted to the vacuum developing device under the influence of vacuum developed by the vacuum developing device. The dust may be stored at the vacuum developing device or otherwise disposed. Vacuum developing devices having air propulsion devices such as vacuum cleaners and dust collectors (none shown) are well known and need not be further detailed herein.

Regardless of its precise nature, the dust suppressing appliance may be readily connected to and disconnected from the auxiliary electrical circuit 26. This characteristic enables the function of the dust suppressing appliance to be satisfied without obliging the operator of the miter saw 10 to obtain a dust suppressing appliance which was initially designed or fabricated to incorporate elements which would be necessary to achieve operable compatibility with the miter saw 10. Notably, the dust suppressing appliance may be of the type provided with an integral plug and cord assembly 34 (see FIG. 3) intended to be compatible with standard electrical receptacles. It then becomes practical to plug the plug and cord assembly 34 into a receptacle 36 provided as part of the auxiliary electrical circuit 26 and to enjoy the benefits of controlling both the miter saw 10 and also the dust suppressing appliance using only the switch lever 22. This will be particularly appreciated by personnel who will thus be spared the necessity of walking to the location of the dust suppressing appliance, where the latter is located away from the miter saw 10, each time it is desired to stop operation of the dust suppressing appliance.

Before turning attention to the particulars of the electrical circuitry which achieves synchronous control of the two loads, some characteristics of the miter saw 10 will be described.

The miter saw 10 may have a pivotal cutting blade support which is disposed to support the dynamic cutting blade 14 selectively at different angles. This may be achieved by making a support post 38 which holds and supports both the cutting tool electric motor 12 and the dynamic cutting blade 14 selectively at different angular orientations relative to the work support table 18. This ability to assume different angular orientations is shown in FIG. 1 in the solid line and broken line renderings, and also by the arrow 40. The arrow 40 indicates pivot of the cutting tool electric motor 12 and the dynamic cutting blade 14 about a vertical pivot axis 42.

As employed herein, orientational terms such as vertical and horizontal refer to the orientation of the subject matter of the referenced drawings. For example, because the depiction of FIG. 1 is a top plan view, it follows that horizontal may refer to right-to-left and top-to-bottom orthogonal directions and combinations of these in the depiction. Similarly, a vertical line such as that of the vertical pivot axis 42 can only be seen as a theoretical geometric point in FIG. 1.

The miter saw 10 also has adjustable positioning of the dynamic cutting blade 14 with respect to vertical distance above the work support table 18. The latter adjustment is achieved by grasping a handle 44 and moving the cutting tool electric motor 12 and the dynamic cutting blade 14 about a horizontal axis 46. The cutting tool electric motor 12 and the dynamic cutting blade 14 will responsively swing upwardly from and downwardly towards the work support table 18 and a workpiece such as the workpiece 2 supported on the work support table 18.

Figure 2:
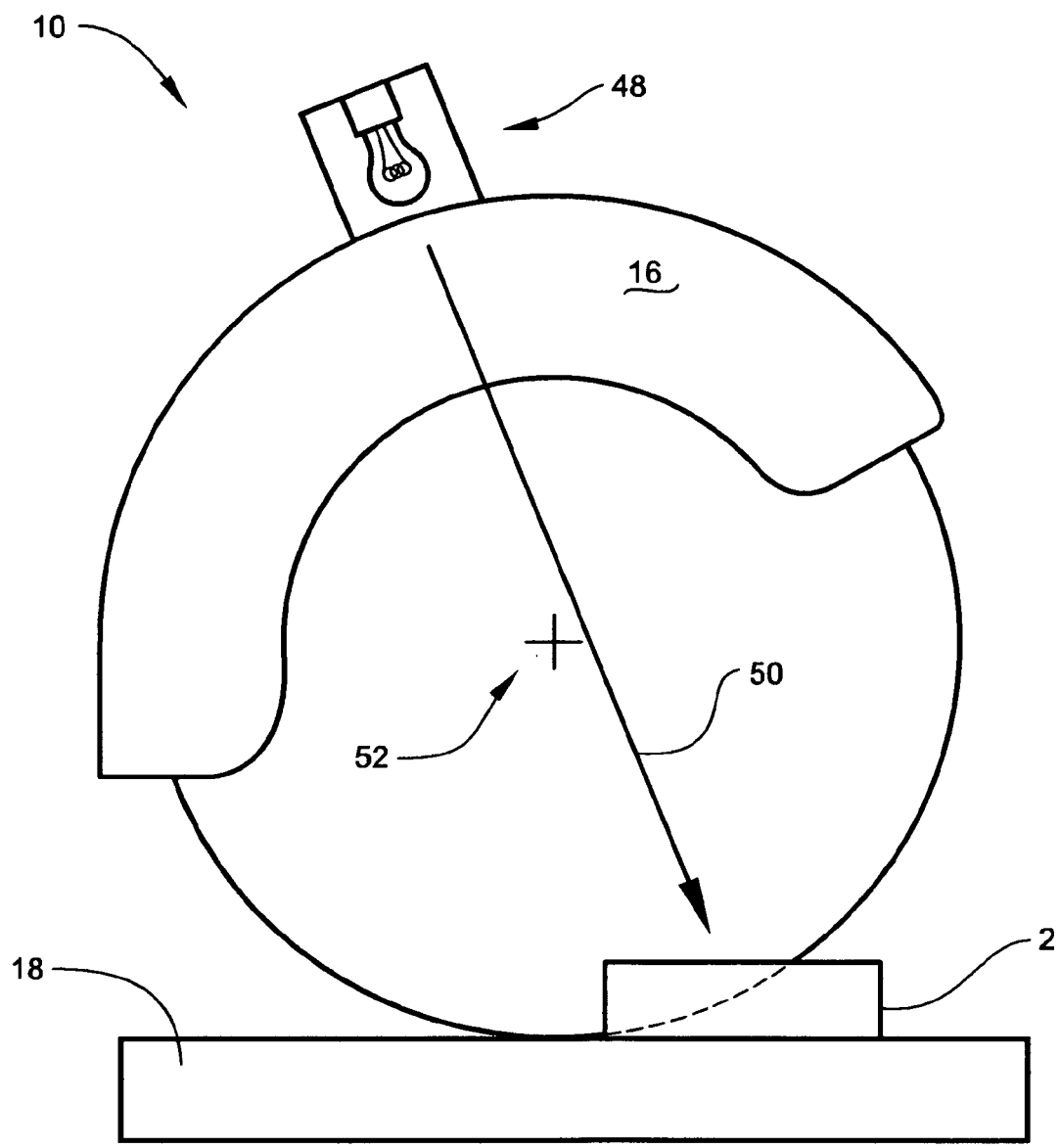
FIG. 2 is an environmental, diagrammatic side elevational view of the cutting tool of FIG. 1.

The dynamic cutting blade 14 may be illuminated by an electric lamp 48 which is disposed to project light along the dynamic cutting blade 14 onto the point of contact between the dynamic cutting blade and a workpiece being cut using the dynamic cutting blade. In the example of the miter saw 10, this direction may be generally similar to parallel to the circular dynamic cutting blade 14, and is indicated by the arrow 50. This relationship is shown in FIG. 2, which also shows the rotational axis 52 of the cutting tool electric motor 12 and of the dynamic cutting blade 14.

Figure 3:
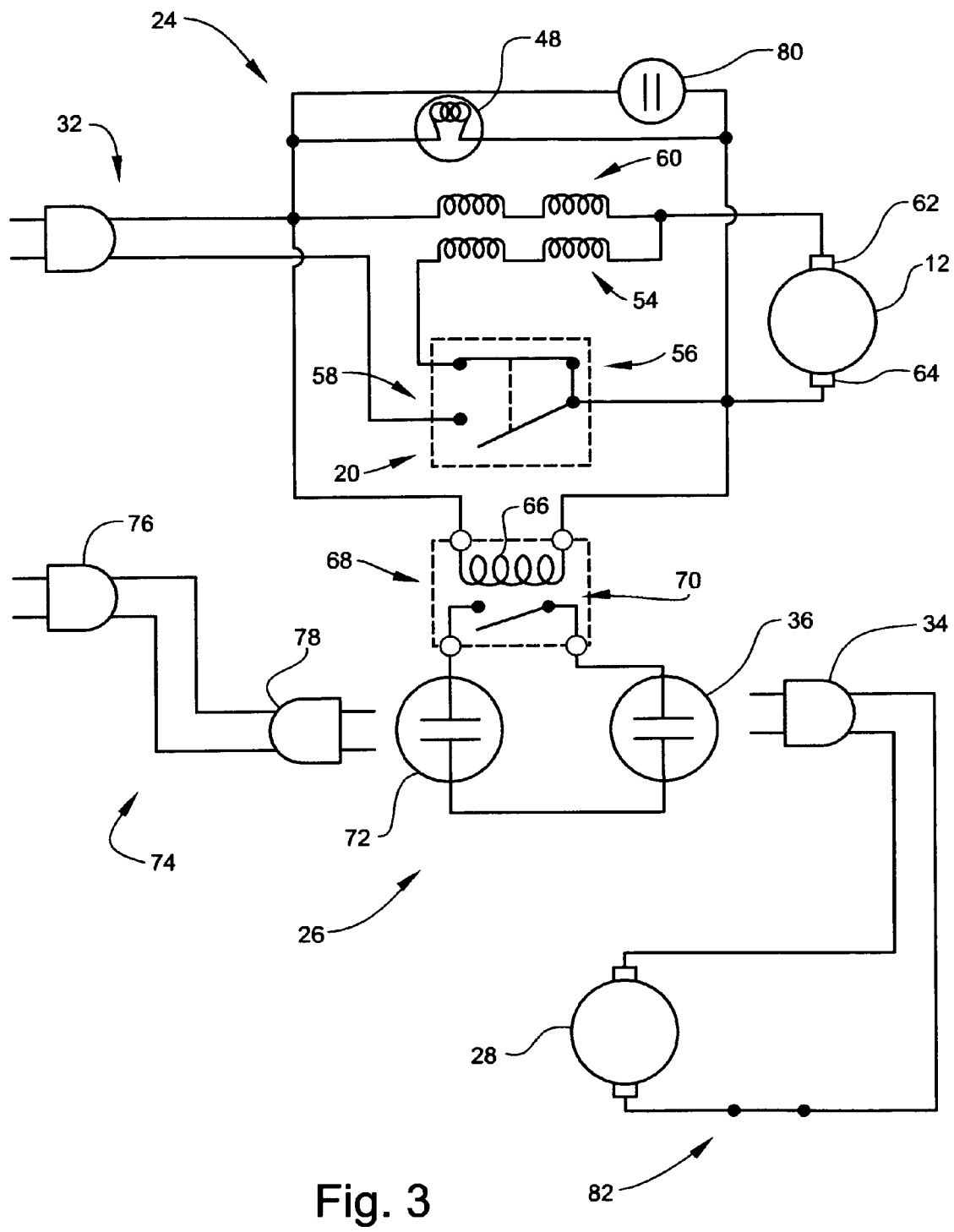
FIG. 3 is an electrical schematic view of a cutting tool and associated appliance and power conductive cords which may be used to operate and supplement operation of the cutting tool, according to at least one aspect of the invention.

Turning now to FIG. 3, the electrical circuitry of the invention is explained. As stated priorly, the electrical circuitry of the miter saw 10 comprises the principal electrical circuit 24 and the auxiliary electrical circuit 26. The principal electrical circuit 24 comprises the principal switch 20 which may be employed to connect and disconnect from electrical power the electrical loads associated with the miter saw 10. Power is derived from a standard electrical receptacle (not shown) provided as part of the premises at which the miter saw 10 is utilized by inserting the plug and cord assembly 32 into the standard electrical receptacle. When the principal switch 20 is in the "off" state as illustrated, the cutting tool electric motor 12 is disconnected from power and may be braked by a braking coil 54 of a dynamic brake (not shown in its entirety).

When the principal switch 20 is moved to the "on" state, in which normally closed contacts 56 are opened and normally closed set of contacts 58 is closed, power is connected to a field coil 60 and brushes 62, 64 associated with the cutting tool electric motor 12. It will also be seen that the electric lamp 48, and the magnetizing coil 66 of a relay 68 are also energized. The relay 68 may be regarded as an auxiliary switch arranged to make and break electrical continuity of the auxiliary electrical circuit 26 simultaneously with and under the control of the switch operator 22 of the principal switch 20.

Upon the magnetizing coil 66 of the relay 68 being energized, normally open contacts 70 of the relay are closed, thereby closing the partial circuit with connects the receptacle 36 to another receptacle 72. It is important to note this continuity, which occurs simultaneously with connecting all power consuming components of the cutting tool electric motor 12 to power.

This in and of itself does not start the appliance electric motor 28. The appliance electric motor 28 may be actually connected to operating power in either one of two ways. In one way, an extension cord 74 having a first plug and cord assembly 76 and a second plug and cord assembly 78 may be connected to the standard electrical receptacle (not shown) of the residential electrical system, provided that the selected electrical receptacle is not on the same circuit as that into which the plug and cord assembly 32 has been inserted. This connection scheme is not an absolute condition, but is an assurance that the protective device serving the selected electrical receptacles will not open the power circuit, as could occur should both the cutting tool electric motor 12 and the appliance electric motor 28 be connected to the same general purpose receptacle circuit.

With the plug and cord assembly 34 of the dust suppressing appliance inserted into the receptacle 36, and with the extension cord 74 plugged into the receptacle 72 and into an active residential general purpose electrical receptacle, the dust suppressing appliance may be started and stopped in synchrony with the cutting tool electric motor 12 by the use of the principal switch 20. The on-off switch 82 of the dust suppressing appliance may be left in the "on" condition as control functions will be satisfied by the principal switch 20 mounted on the miter saw 10.

Another connection scheme may be practiced where it is known that the residential power circuit serving the electrical receptacle into which the plug and cord assembly 32 has been inserted is of sufficient ampacity to serve all loads which are to be connected thereto. In this latter case, an electrical receptacle 80 which may optionally be provided as part of the principal electrical circuit 24, such as by hard wiring thereto, and may receive the plug and cord assembly 34. As seen in the circuit diagram of FIG. 3, it will be apparent that the electrical receptacle 80 will be energized whenever the cutting tool electric motor 12 is running.

The electrical receptacles 36 and 72 of the auxiliary electrical circuit 26 may be regarded as first and second terminals each enabling ready connection to the auxiliary electrical circuit 26. Ready connection signifies that connection may be made entirely manually. As one example, a plug and cord assembly, such as the plug and cord assemblies 32, 34, 76, and 78 may be of the conventional type which is manually inserted into an electrical receptacle and retained by friction. No tools are required for either installation or removal. Other types of terminals or receptacles may be utilized provided they do not require tools for proper installation. For example, a terminal having an Edison base or manual latch may be utilized, and would be regarded as the equivalent of plug and cord assemblies for the purpose of ready connection.

The electrical receptacle 80 may be regarded as a third terminal which is hard wired to the principal electrical circuit 24 and which provides the convenience of toolless manual insertion or connection of a plug and cord assembly, such as the plug and cord assembly 34.

The invention is subject to variations and modifications which may be introduced without departing from the inventive concept.

For example, the principal switch 20 and the auxiliary switch 68 may be varied from those shown and described herein. For example, the principal switch 20 and the auxiliary switch 68 may be provided as a single assembly (not shown) rather than as the two separate elements presented priorly. The principal switch 20 may comprise a purely mechanical switch such as a toggle action switch or a cam or barrel switch, for example, having the requisite number of poles or contacts to accomplish the functions described herein. Alternatively, the principal switch 20 may comprise an electromechanical switch having an energizable magnet, such as the relay 68, a contactor, or motor starter, or may be an electronic or so-called solid state switch (not shown). The same options apply to the auxiliary switch 68, provided that the functions described herein may be successfully accomplished.

The dust suppressing appliance may be other than a vacuum developing device. For example, the dust suppressing appliance may operate on positive pressure, or on air which has been pressurized to a degree greater than ambient air pressure. The dust suppressing device may also utilize liquids. For example, the dust suppressing device may spray water or other liquids or both at the work site. This may be done by itself or in conjunction with vacuum and positive pressure dust suppressing operations. The dust suppressing device may develop vacuum or low pressure, may develop positive pressure, or may merely distribute and control fluids derived from other sources and operating under conditions of vacuum or positive pressure.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

We claim:

1. A cutting tool for cutting a workpiece, comprising:
a frame;
a cutting tool electric motor supported on the frame;
a dynamic cutting blade which is operably drivable by the cutting tool electric motor and which is movably supported on the frame;
a principal electrical circuit attached to the frame, including a principal switch having a switch operator, connected to the cutting tool electric motor under on-off control of the principal switch; and
an auxiliary electrical circuit attached to the frame, having a first terminal enabling ready connection to an electrical power source, a second terminal enabling ready connection of the plug of an electrical plug and cord assembly, and an auxiliary switch arranged to make and break electrical continuity of the auxiliary electrical circuit simultaneously with and under the control of the switch operator of the principal switch, wherein the principal electrical circuit and the auxiliary electrical circuit are separate and distinct, such that plural loads may both be started and stopped simultaneously even though both plural loads may be supplied with electrical power from two independent sources.

2. The cutting tool according to claim 1, further comprising an electric lamp disposed to project light onto the point of contact between the dynamic cutting blade and a workpiece being cut using the dynamic cutting blade.

3. The cutting tool according to claim 1, further comprising:
a work support table for receiving a workpiece; and
a pivotal cutting blade support which is disposed to support the dynamic cutting blade selectively at different angular orientations relative to the work support table.

4. The cutting tool according to claim 3, wherein the dynamic cutting blade is a circular blade, and the pivotal cutting blade support is disposed selectively to vary angularity of the circular blade relative to the work support table.

5. The cutting tool according to claim 4, further comprising an electric lamp disposed to project light along the circular blade in a direction similar to parallel to the circular blade.

6. The cutting tool according to claim 1, wherein the auxiliary switching element comprises a relay disposed to make and break continuity of the auxiliary electrical circuit.

7. The cutting tool according to claim 6, wherein the relay is an electromechanical relay.

8. The cutting tool according to claim 1, wherein the principal electrical circuit comprises a dynamic brake disposed to brake the dynamic cutting blade when electrical power is disconnected from the cutting tool electric motor using the principal switch.

9. The cutting tool according to claim 7, further comprising a dust suppressing appliance having an appliance electric motor, an electric appliance electrical circuit disposed to be readily connectable to the second terminal of the auxiliary electrical circuit and to conduct electrical power from the second terminal of the auxiliary electrical circuit to the appliance electric motor, and an air propulsion device which is dynamically drivable by the appliance electric motor.

10. The cutting tool according to claim 9, wherein the dust suppressing appliance is a vacuum developing device having a conduit disposed to conduct air from near the dynamic cutting blade to a location away from the cutting tool under the influence of vacuum developed by the vacuum developing device.

11. The cutting tool according to claim 1, further comprising a third terminal which is hard wired to the first electrical circuit, comprising a standard receptacle.

* * * * *